(12) United States Patent
Yu

(10) Patent No.: US 12,379,516 B2
(45) Date of Patent: Aug. 5, 2025

(54) SYSTEMS AND METHODS FOR RESERVOIR CHARACTERIZATION

(71) Applicant: CHINA PETROLEUM & CHEMICAL CORPORATION, Beijing (CN)

(72) Inventor: Jianhua Yu, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 429 days.

(21) Appl. No.: 18/054,320

(22) Filed: Nov. 10, 2022

(65) Prior Publication Data
US 2023/0184974 A1 Jun. 15, 2023

Related U.S. Application Data

(60) Provisional application No. 63/288,306, filed on Dec. 10, 2021.

(51) Int. Cl.
*G01V 1/30* (2006.01)
*G01V 1/104* (2006.01)
*G01V 1/28* (2006.01)

(52) U.S. Cl.
CPC ............. *G01V 1/30* (2013.01); *G01V 1/104* (2013.01); *G01V 1/282* (2013.01); *G01V 2210/121* (2013.01); *G01V 2210/1295* (2013.01); *G01V 2210/1425* (2013.01); *G01V 2210/1429* (2013.01); *G01V 2210/66* (2013.01)

(58) Field of Classification Search
CPC .......... G01V 1/30; G01V 1/104; G01V 1/282; G01V 2210/121; G01V 2210/1295; G01V 2210/1425; G01V 2210/1429; G01V 2210/66
See application file for complete search history.

(56) References Cited

U.S. PATENT DOCUMENTS

| | | | |
|---|---|---|---|
| 8,386,218 B2 * | 2/2013 | Shin ..................... | G01V 1/303 703/6 |
| 9,772,413 B2 * | 9/2017 | Krohn ................. | G01V 1/3808 |
| 10,295,683 B2 * | 5/2019 | Du ........................ | G01V 1/282 |
| 11,550,974 B2 * | 1/2023 | Samson ................ | G01V 20/00 |

* cited by examiner

*Primary Examiner* — Elias Desta
(74) *Attorney, Agent, or Firm* — NKL Law; Allen Xue

(57) ABSTRACT

Hybrid seismic inversion methods and apparatuses perform wave equation inversion and stochastic inversion to generate one or more final models for the reservoir characterization of the survey region. A method may include retrieving seismic data using seismic data recording sensors; storing the seismic data in the database; retrieving well data using the well bore sensor in the wellbore; storing the seismic data in the database; storing geology integration information and one or more background models in the database; retrieving the seismic data and processing the seismic data to mitigate the seismic data for a seismic hybrid inversion; and performing the seismic hybrid inversion including performing wave equation inversion and stochastic inversion to generate the one or more final models for the reservoir characterization of the survey region.

20 Claims, 4 Drawing Sheets

SYSTEMS AND METHODS FOR RESERVOIR CHARACTERIZATION

TECHNICAL FIELD

The present disclosure relates to computer-implemented methods and systems for lithology identification and fluid discrimination in the field of seismic exploration and reservoir characterization.

BACKGROUND

Seismic inversion is widely used in reservoir characterization to extract subsurface rock elastic parameters based on seismic data information including phase information and amplitude information. Seismic inversion plays a significant role in the exploration, development, and production of hydrocarbon reservoirs in the oil and gas industry. Generally, there are two families of seismic inversion approaches (seismic inversion methods or seismic inversion technology), which are seismic deterministic inversion (deterministic inversion) and seismic stochastic inversion (stochastic inversion). The deterministic inversion intends to produce a single best least square solution while stochastic inversion produces many most probable solutions, which average to the deterministic inversion result.

Small volume geobody and thin bed reservoirs have become hot spots for hydrocarbon exploration targets, and play a role of great importance in increasing reservoir evaluation. With exploration targets focusing on small volume geobodies and thin beds, a lot of research has been done to develop a novel seismic inversion to overcome the challenges of poor resolution to thin beds and small volume geobodies. These challenges include how to handle complicated seismic signal propagation correctly. A current commonly used seismic inversion technology is based on Zoeppritz theory. However, when seismic signals propagate through a subsurface medium, the seismic signal wavefield characteristic becomes very complicated, which poses challenges to the seismic inversion technology based on Zoeppritz theory and a convolution model.

Seismic inversion approaches, developed based on the conventional theory assumptions, work well when the subsurface medium property varies mildly. These seismic inversion approaches assume that only primary signals in observed data are allowed to be used, so that other types of waves will be treated as noise that introduce more uncertainty in a derived reservoir property. For the thin interbed reservoirs, the above assumption will be violated, which causes the conventional seismic inversion approaches to fail to provide an accurate description of targets. Another challenge to least square optimization based deterministic inversion for resolving thin interbed beds is its poor resolution primarily due to band-limited seismic bandwidth. The failure of conventional seismic inversion technology, together with a lack of well information, often leads to the misinterpretation of reservoir prediction. Moreover, in field data processing of a seismic survey region, data are usually sparse and contaminated by noise. Accordingly, it is almost impossible for any single conventional inversion method to generate one or more unique correct subsurface models used in reservoir characterization without assistance from well data and geological interpretation.

Seismic stochastic inversion, as a complementary method to seismic deterministic inversion, is a combination of contributions from a geostatistical inference process and a seismic inversion algorithm. In the stochastic inversion method, the broadband starting or prior model statistical distribution in a model space from all the well data and geology in Bayesian statistics are constructed. Together with seismic data fitting integration, it creates the more detailed models of subsurface under certain assumptions to a subsurface model statistical distribution. Each subsurface model generated from stochastic inversion is the most probable realization to the real model in geostatistics. The goal of stochastic inversion is to help increase the resolution of seismic inversion and provide statistical measures of the uncertainties involved in seismic inversion. However, stochastic inversion still uses the same theory in seismic data fitting calculations and requires a huge computational effort compared to deterministic inversion.

Thus, it is important to address the above-identified issues to improve the quality of resolution in seismic inversion results to improve lithology identification and fluid discrimination in the field of seismic exploration and reservoir characterization.

SUMMARY

One or more embodiments provide a hybrid seismic inversion methods and apparatuses that perform wave equation inversion and stochastic inversion to generate one or more final models for the reservoir characterization of the survey region.

In an aspect, there is provided a method for generating one or more final models for reservoir characterization of a survey region. The method may include positioning seismic data recording sensors in the survey region at different locations and positioning a well bore data recording sensor in a wellbore, which has a wellbore location; blasting at points of incidence in the survey region; retrieving seismic data using the seismic data recording sensors, transmitting the seismic data to a database, and storing the seismic data in the database; retrieving well data using the well born sensor in the wellbore, transmitting the well data to the database, and storing the seismic data in the database; storing geology integration information and one or more background models in the database; retrieving, by a computer system, the seismic data and processing the seismic data to mitigate the seismic data for a seismic hybrid inversion; and performing, by the computer system, the seismic hybrid inversion including performing wave equation inversion and stochastic inversion to generate the one or more final models for the reservoir characterization of the survey region.

In an aspect, the seismic data recording sensors and the well bore recording sensor may be the same sensors.

In an aspect, the method operation of performing, by the computer system, the seismic hybrid inversion may further include shifting processed seismic data on an acquisition surface to a top of a reservoir target; calculating seismic attributes based on the shifted seismic data; computing correlation coefficients of the seismic attributes between spatial locations of the well bore and the seismic data recording sensors; generating a prior model based on the correlation coefficients of the seismic attributes; and communicating at least one of the elastic wave equation inversion and the stochastic inversion to communicate the prior model.

In an aspect, the shifted processed seismic data on the acquisition surface may be shifted to a top of a reservoir target by performing a data-mining process.

In an aspect, the seismic attributes may include amplitude envelope, amplitude weighted frequency, amplitude weighted phase, average frequency, apparent polarity, cosine instantaneous phase, derivative of seismic data, derivative instantaneous amplitude, dominant frequency, instantaneous frequency, instantaneous phase, and integrated absolute amplitude.

In an aspect, the method operation of performing, by the computer system, the seismic hybrid inversion may further include generating a starting model based on the processed seismic data, well data, geology integration information, and one or more background models, wherein the one or more background models are current models.

In an aspect, geology integration information may include one or more horizons, and background models may include one or more of a P-wave velocity model, an S-wave velocity model, and a density model.

In an aspect, the method operation of performing, by the computer system, the seismic hybrid inversion further comprises generating simulated seismic data, which may be a seismogram or synthetic data generated by an elastic wave equation.

In an aspect, the method operation of performing, by the computer system, the seismic hybrid inversion further may include determining an amount of a data misfit; outputting one or more final models for the reservoir characterization of the survey region based on the amount of the data misfit being less than an allowable value; and performing the elastic wave equation inversion on one or more current models based on the amount of the data misfit exceeding an allowable value.

In an aspect, the allowable value may be in the range of 0.001 to 0.01.

In an aspect, the method operation of performing, by the computer system, the seismic hybrid inversion may further include constructing a posterior a posterior density function with a Bayesian theorem using likelihood function and a joint probability density distribution function using a Kriging method based on well data, the elastic wave equation inversion, and a prior model.

In an aspect, the prior model is generated based on correlation coefficients of seismic attributes calculated based on shifting seismic data on an acquisition surface to a top of a reservoir target, and wherein the correlation coefficients of seismic attributes are between spatial locations of the well bore and the seismic data recording sensors.

In an aspect, the method operation of performing, by the computer system, the seismic hybrid inversion further may further include randomly sampling a simulated value in model space and adding the simulated value to the set of the known sampled points until all unknown locations are simulated in the model space.

In an aspect, the method operation of performing, by the computer system, the seismic hybrid inversion may further include outputting the final models.

In an aspect, there is provided an apparatus for generating one or more final models for reservoir characterization of a survey region. The apparatus may include apparatus a plurality of seismic data recording sensors positioned at different locations in the survey region to detect seismic data and transmit seismic data; a well bore data recording sensor positioned in a wellbore of the survey region to detect seismic data and transmit seismic data; at least one memory storing the transmitted seismic data, geology integration information, and one or more background models, the at least one memory comprising instructions and at least one processor to execute instructions stored in the at least one memory to implement: processing the seismic data to mitigate the seismic data for a seismic hybrid inversion; and performing the seismic hybrid inversion including performing wave equation inversion and stochastic inversion to generate the one or more final models for the reservoir characterization of the survey region.

In an aspect, the performing the seismic hybrid inversion may further include shifting processed seismic data on an acquisition surface to a top of a reservoir target; calculating seismic attributes based on the shifted seismic data; computing correlation coefficients of the seismic attributes between spatial locations of the well bore and the seismic data recording sensors; generating a prior model based on the correlation coefficients of the seismic attributes; and communicating at least one of the elastic wave equation inversion and the stochastic inversion to communicate the prior model.

In an aspect, the shifted processed seismic data on the acquisition surface is shifted to a top of a reservoir target by performing a data-mining process.

In an aspect, the seismic attributes include amplitude envelope, amplitude weighted frequency, amplitude weighted phase, average frequency, apparent polarity, cosine instantaneous phase, derivative of seismic data, derivative instantaneous amplitude, dominant frequency, instantaneous frequency, instantaneous phase, and integrated absolute amplitude.

In an aspect, the performing, by the computer system, the seismic hybrid inversion may further include generating a starting model based on the processed seismic data, well data, geology integration information, and one or more background models, wherein the one or more background models are current models.

In an aspect, the geology integration information may include one or more horizons, and the background models may include one or more of a P-wave velocity model, an S-wave velocity model, and a density model.

BRIEF DESCRIPTION OF THE DRAWINGS

The teachings of the present invention can be readily understood by considering the following detailed description in conjunction with the accompanying drawings.

DETAILED DESCRIPTION

Figure 1:
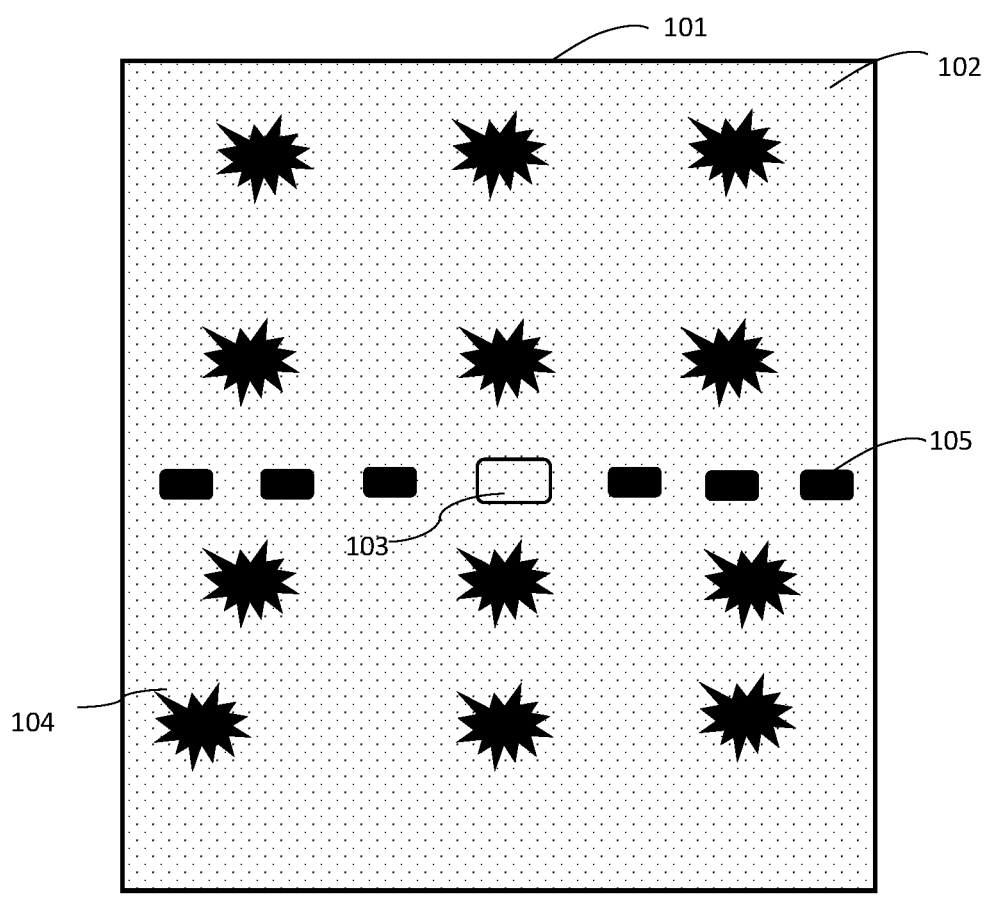
FIG. 1 is a schematic diagram illustrating a top view of a survey region with the various points of incidence of seismic sources according to an embodiment.

Reference will now be made in detail to embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the disclosure.

Throughout the specification, the terms approach(es), method(s), and technology are used interchangeably and have the same meaning.

Throughout the specification, the terms hybrid seismic inversion, hybrid elastic wave equation inversion, and hybrid inversion are used interchangeably and have the same meaning.

A new seismic inversion technology is needed to handle complicated seismic signal propagation correctly to provide an improved quality of resolution to improve lithographic identification, fluid discrimination, and reservoir characterization in the field of seismic exploration and reservoir characterization. In order to improve seismic inversion results with an improved quality of resolution, it is essential to improve current seismic inversion technology so that a new seismic inversion technology is able to extract one or more subsurface models with reliable quality and it is capable of handling thin interbed acquisition data including full wave information such as a primary signal, a converted wave, and multiples.

One or more embodiments may integrate wave equation inversion and stochastic inversion to develop a hybrid elastic wave-equation inversion workflow, which improves on the accuracy, certainty, and robust interpretation of one or more subsurface model properties and seismic data to improve the quality of resolution in improved seismic inversion results to quality of resolution to improve lithographic identification, fluid discrimination, and reservoir characterization in the field of seismic exploration and reservoir characterization.

In one or more embodiments, a reservoir seismic inversion approach that integrates a wave equation based elastic parameter estimation approach with a stochastic simulation approach is provided as a hybrid inversion method. This hybrid inversion method integrates the advantages of deterministic elastic wave equation inversion (wave equation inversion) and stochastic inversion that uses elastic wave equation theory as a wavefield propagation engine to replace a convolution model in order to handle complex wavefield propagation in a subsurface medium. This method also reduces one or more strict assumptions behind the conventional seismic inversion theory, such as seismic data only includes primary reflection signals. Wave equation inversion is expected to release one or more strict assumptions from conventional Zoeppritz inversion theory that may compromise seismic inversion quality when there is multiple and converted waves in field data. Stochastic inversion is a combination of the contributions of geostatistics and a seismic inversion algorithm using different source data with a different scale as prior information under the Bayesian inference frame. Each subsurface model derived from stochastic inversion helps extracting details of reservoir property with more information than deterministic inversion. Therefore, one or more embodiments of a hybrid inversion approach can produce robust seismic inversion results due to an improved handling of complex seismic wave propagation using a deterministic elastic wave equation. In addition, the inverted subsurface models from wave equation inversion technology is treated as a new kind of source data in hybrid inversion, and the more details of a model are added with the assistance of stochastic inversion by geostatistical simulation.

Utilizing elastic wave equation inversion incurs a large computational cost. A target-oriented inversion approach is adopted with a volume integral approach to solve an elastic wave equation. In one or more embodiments, a numerical solver of a volume integral approach for an elastic wave equation provides the flexibility to handle boundary condition and reservoir. More important is that it eliminates certain common issues in a finite difference numerical solver to wave-equation equation, such as that numerical dispersion problem that may limit the up frequency. In addition, to address the extremely complex relationship of seismic data and subsurface medium parameters, it is difficult to build up an analytic relationship using the deterministic approach or magic mathematic equation to represent their geologic environment relationship. To take full advantage of multi-source data from different disciplines, the required data sets are collected before starting a hybrid inversion. The data sets include seismic data, seismic attributes derived from seismic data, well data, and geology integration information. Examples of seismic attributes include amplitude envelope, amplitude weighted frequency, amplitude weighted phase, average frequency, apparent polarity, cosine instantaneous phase, derivative of seismic data, derivative instantaneous amplitude, dominant frequency, instantaneous frequency, instantaneous phase, and integrated absolute amplitude, etc. One or more seismic attributes may be selected by a user.

All the multi-source data is analyzed and combined into a few dominant synthetic seismic attributes. Subsequently, this attribute data is incorporated into stochastic inversion as the priori information model as one of prior probability distribution. For studying an area having a specific geology setting, there is a probability that each model derived from above data represents the subsurface model. The stochastic inversion step (operation) intends to find its subsurface situation and model reliability by analyzing the probability distribution. Therefore, stochastic inversion, following elastic wave equation inversion, is considered as the supplement to tune an elastic wave equation inversion model to improve quality to better honor seismic data, well log data, and geology integration information. The implementation of stochastic inversion step (operation) in a hybrid inversion approach is based on stochastic simulation that integrates multi-discipline information from wave-equation inversion results, seismic attribute derived models, seismic data and well log data under a Bayesian framework. The multi-discipline information may include geological information such as sediment faces.

According to Bayesian theorem, seismic inversion can be considered as a posterior probability distribution function $P(m|d)$ constrained by variogram and observed data d. The posterior probability distribution is related to the prior probability distribution $P(m)$ as following equation (1).

$$P(m|d)=P(d|m)P(m)/P(d) \qquad \text{(Equation 1)}.$$

$P(d)$ denotes as evidence and is treated as a constant. Accordingly, the approximation of equation (1) is expressed in the following equation (2).

$$P(m|d)=P(m)P(d|m) \qquad \text{(Equation 2)}.$$

A posterior probability distribution is the production of two components: the likelihood probability $P(d|m)$ denotes the measurement of how well synthetic seismic data generated based on current subsurface model m fits to acquired data; and second component $P(m)$ is a prior probability density function (PDF) which denotes the initial probability distributed but not constrained by known data sets d, such as seismic data and well data with m being a subsurface model. The hybrid inversion approach builds a joint probability density function to yield a more reliable subsurface model with a low-mid-frequency model m' derived from an elastic wave equation inversion algorithm. Therefore, the following equation conditioned with multi-source data is written as the following equation (3).

$$P(m|d,w,g,m')=P(d|m)P(m|m')P(m/w)P(m) \qquad \text{(Equation 3)},$$

where w and g represent well data and geology integration information for subsurface models, respectively. P(m|m') and p(m|w) are priori on the wave-equation inverted model and well data. P(m) is a prior on seismic attribute derived model.

Equation 3 states that the posterior probability function of subsurface model m is conditioned by wave-equation inverted models, seismic data d, well data w, and geology integration information g. Stochastic inversion is an approach including sampling based on a joint probability distribution. To implement hybrid inversion, following wave-equation inversion, a sampling algorithm, which is based on a Metropolis sampling method, is used to sample probability space in terms of the above defined multi-dimensional probability distribution to create multiple realizations of subsurface models that better consider all the input data. The results of this sampling are realizations of subsurface model m with associated model m' derived from elastic wave equation inversion.

FIGS. 1-4 show exemplary embodiments of apparatuses and methods to provide an improvement in the quality of resolution of inversion results by using hybrid seismic inversion technology to improve lithology identification, fluid discrimination in the field of seismic exploration and reservoir characterization including the use of a computer-implemented hybrid seismic inversion (hybrid elastic wave equation inversion) approach. FIGS. 1-4 show exemplary embodiments of apparatus and methods for generating one or more final models for reservoir characterization of a survey region including embodiments of a hybrid seismic inversion method.

FIG. 1 is a schematic diagram illustrating a top view of a survey region with the various points of incidence of seismic sources according to an embodiment. More specifically, FIG. 1 illustrates a seismic survey region 101, which is a land-based region denoted by reference numeral 102. Reference numeral 102 denotes the top earth formation of the land-based region 102. Persons of ordinary skill in the art, will recognize that seismic survey regions produce detailed images of local geology to determine the location and size of possible hydrocarbon (oil and gas) reservoirs, and therefore a well location 103. In these survey regions, seismic waves bounce off underground rock formations during emissions from one or more seismic sources at various points of incidence 104. A blast is an example of a seismic source generated by seismic equipment. The seismic waves that reflect back to the surface are captured by seismic data recording sensors 105, transmitted by one or more data transmission systems (frequently wirelessly) from the seismic data recording sensors 105, and stored for later processing and analysis by a high-performance computing system. Although this example shows a top earth formation of a land-based region 102, it is understood that this is only an example and the methods and system may also be applied to a survey region at the bottom of an ocean or other body of water.

Figure 2:
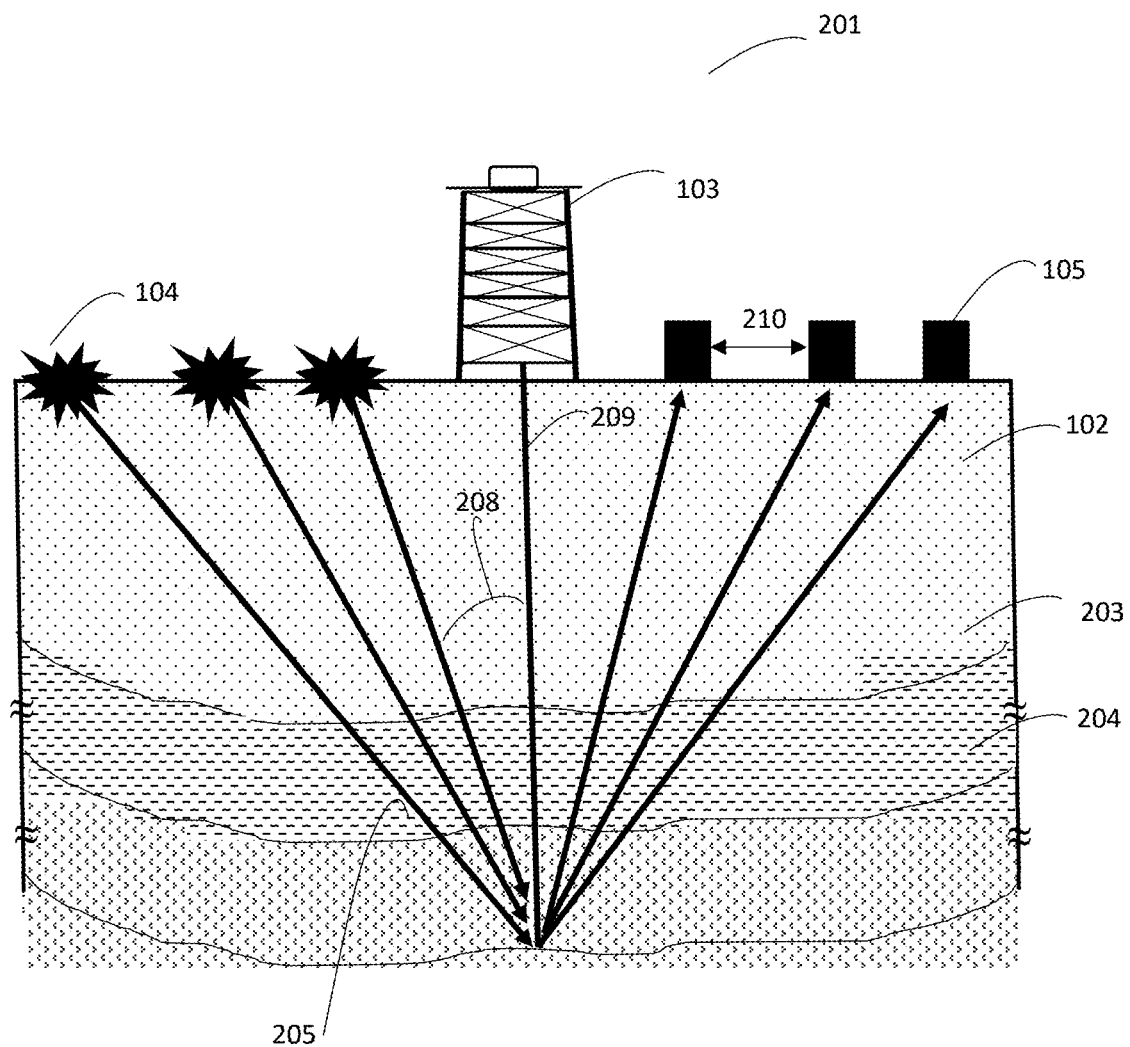
FIG. 2 is a schematic diagram illustrating a cross-sectional view of an environment with points of incidence of seismic sources, seismic receivers, a well location, a wellbore, the various transmission rays, and the various angles of incidence, according to an embodiment.

FIG. 2 is a schematic diagram illustrating a cross-sectional view of a seismic survey region 101 with points of incidence of seismic sources, seismic receivers, a well location, a wellbore, the various transmission rays, and the various angles of incidence, according to an embodiment. More specifically, in FIG. 2 a cross-sectional view of a portion of the earth over the seismic survey region is denoted by reference numeral 201, showing different types of earth formations denoted by reference numerals 102, 203, and 204. Although the seismic survey region is based on land in this example, it is understood that this is only an example and the methods and system may also be applied to a survey region at the bottom of an ocean. FIG. 2 illustrates a common midpoint-style gather, where seismic data are sorted by surface geometry to approximate a single reflection point in the earth. In this example, data from one or more shots or blasts and receivers may be combined into a single image gather or used individually depending upon the type of analysis to be performed. Although FIG. 2 may illustrate a flat reflector and a respective image gather class, other types or classes of image gathers known in the art may be used, and its selection may depend upon the presence of various earth conditions or events. One or more shots or blasts represents seismic sources located at various points of incidence or stations denoted by reference numeral 104 at the surface of the Earth at which one or more seismic sources are activated.

As shown on FIG. 2, seismic energy or seismic sources from multiple points of incidence 104, are reflected from the interface between the different earth formations. These reflections are captured by multiple seismic data recording sensors 105, each of which is placed at different location offsets 210 from each other, and the well 103. Because all points of incidences 104, and all seismic data recording sensors 105 are placed at different offsets 210, the survey seismic data or traces, also known in the art as gathers, are recorded at various angles of incidence represented by 208. The points of incidence 104 generate downward transmission rays 205, in the earth that are captured by their upward transmission reflection through the seismic data recording sensors 105. Well location 103, in this example, is illustrated with an existing drilled well attached to a wellbore, 209, along which multiple measurements are obtained using techniques known in the art. This wellbore 209, is used to obtain well log data, which may include P-wave velocity, S-wave velocity, Density, among others. Other sensors, not depicted in FIG. 2 for simplicity and clarity, may be placed within the survey region to capture seismic data. Seismic data may be used to examine the dependence of amplitude, signal-to-noise, move-out, frequency content, phase, and other seismic attributes, on incidence angles 208, offset measurements 210, azimuth, and other geometric attributes that are important for data processing and imaging of a seismic survey region.

Figure 3:
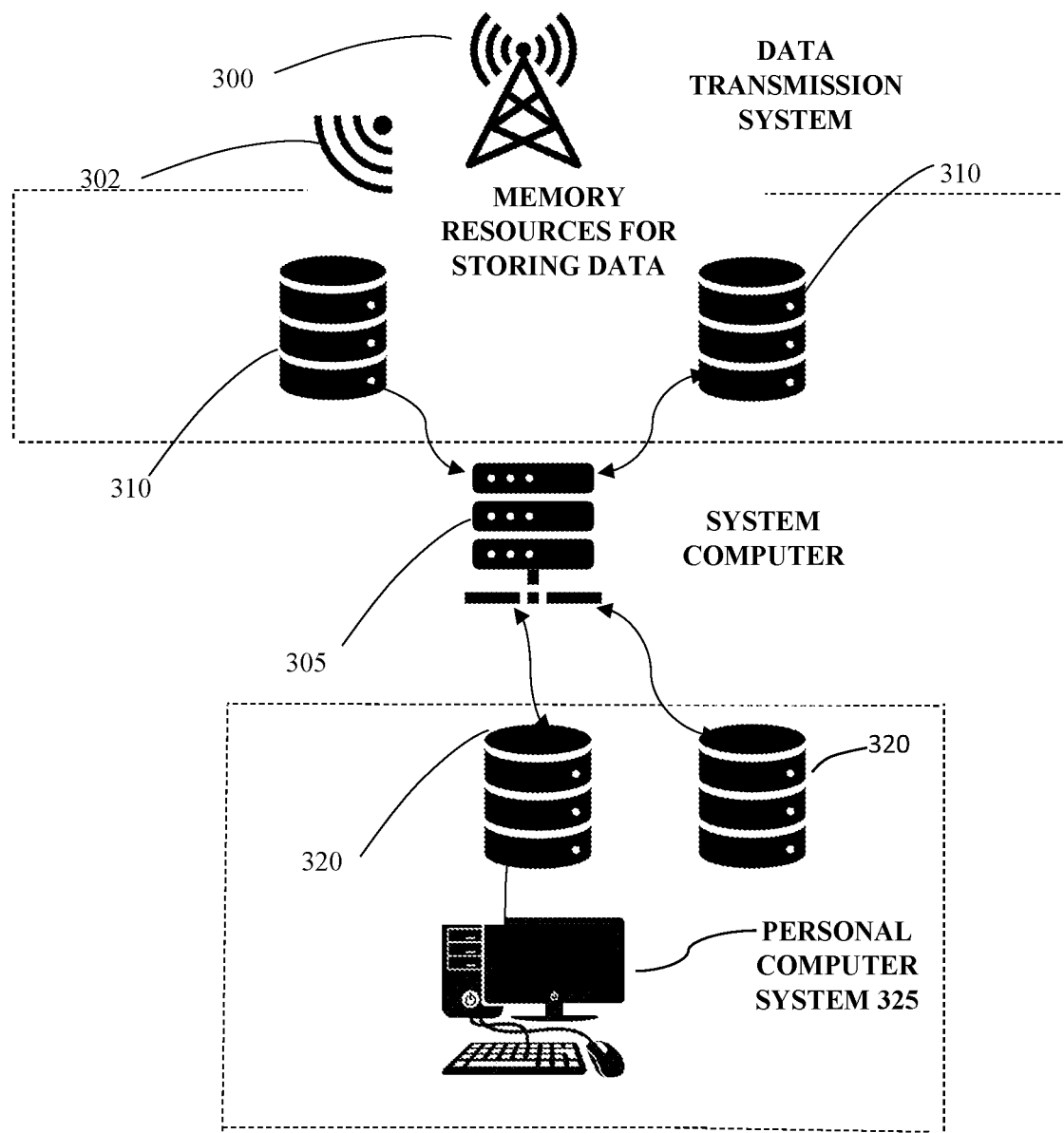
FIG. 3 is a schematic diagram illustrating a high-performance computing system according to an embodiment.

FIG. 3 is a schematic diagram illustrating a high-performance computer system according to an embodiment, which receives (frequently wirelessly) seismic data regarding seismic waves from the seismic data recording sensors 105 and stores the seismic data in at least one memory for later processing and analysis by computer implemented methods and apparatuses of one or more embodiments. The analyzed or processed seismic data may be accessed by a personal computer system. More specifically, FIG. 3 shows a data transmission system 300 for wirelessly transmitting seismic data from seismic data recording sensors 105 to a system computer 305 coupled to one or more storage devices 310 to store the seismic data in databases. The data transmission system may also transmit wirelessly seismic data from seismic data recording sensors 105 directly to one or more storage devices 310 to store the seismic data in databases, which may be accessed by system computer 305. The wireless transmission is denoted by reference numeral 302. The one or more storage devices 310 may also store other computer software instructions or programs to implement apparatuses and methods described in embodiments. The system computer 305 may be coupled (e.g., wirelessly coupled) to one or more output storage devices 320, which may receive the results of computer implemented processes or methods performed by the system computer 305. A personal computer 325 may be coupled (e.g., wirelessly coupled) to one or more output storage devices 320 and/or to the computer system 305 so that a user may utilize a user interface of the personal computer 325 to input information or obtain the results of the computer implemented processor methods performed by the system computer 305. The one or more storage devices 320 may also store other computer software instructions or programs to implement apparatuses and methods described in embodiments.

A user interface of the personal computer 325 may include, for example, one or more of a keyboard, a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), an output sound device (e.g., a speaker), a track ball, a remote controller, a portable (e.g., a cellular or smart) phone, a tablet PC, a pedal or footswitch, a virtual-reality device, and so on. The user interface may further include a haptic device to provide haptic feedback to a user. The user interface may also include a touchscreen, for example. In addition, a personal computer 325 may be a desktop, a laptop, a tablet, a mobile phone or any other personal computing system.

Processes, functions, methods, and/or computer software instructions or programs in apparatuses and methods described in embodiments herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like.

Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

The one or more databases may include a collection of data and supporting data structures which may be stored, for example, in the one or more storage devices 310 and 320.

For example, the one or more storage devices 310 and 320 may be embodied in one or more non-transitory computer readable storage media, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage devices 310 and 320 are not limited to the above description, and the storage may be realized by other various devices and structures as would be understood by those skilled in the art.

Figure 4:
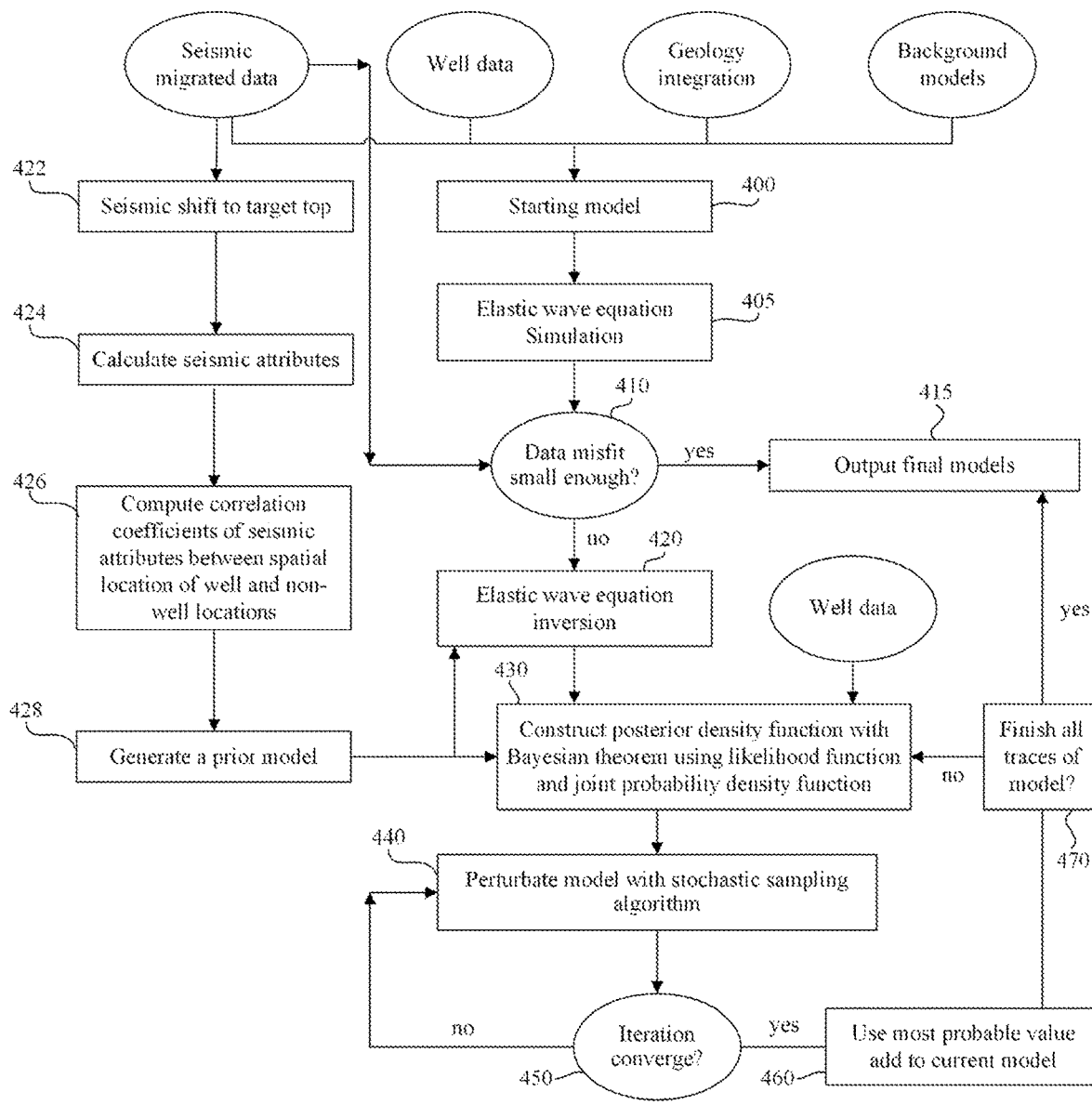
FIG. 4 is a flowchart illustrating a computer-implemented hybrid seismic inversion method according to an embodiment.

FIG. 4 is a flowchart illustrating a computer-implemented hybrid seismic inversion method according to an embodiment. Embodiments of the present application including an embodiment illustrated in FIG. 4 may perform a hybrid seismic inversion utilizing a high-performance computing system which receives seismic data from seismic data recording sensors 105, which sense, record, and transmit seismic data (which is generated in response to blasts in a survey region 101 shown in FIGS. 1 and 2) to the high-performance computing system such as the high performance computing system shown in an embodiment in FIG. 3.

Referring to FIG. 4, seismic survey geometry is the data space that stores seismic data which may be stored in one or more storage devices 310 and 320 in FIG. 3. All of the operations in FIG. 4 are performed in this data space. The input data for the hybrid seismic inversion approach or method in FIG. 4 includes (1) the prestack seismic migrated data in a time-offset domain, (2) background models used in migration, (3) associated geology integration information such as geology deposition faces and geology horizons that represent geology marks and are interpreted from seismic stacked image volumes, and (4) the upscaled well logs data (well data). The prestack seismic migrated data is preprocessed seismic data, which has been preprocessed for use in the method shown in FIG. 4. The prestack migrated seismic data are the migrated gathers with (1) reflection offset/angle/slowness as the horizontal axis and (2) time as the vertical axis. The background models include P-wave velocity, S-wave velocity, and density models. The up scaled well log data may include P-wave velocity, S-wave velocity and the density in the time or depth domain.

In operation 400, the (1) the prestack seismic migrated data in a time-offset domain, (2) background models used in migration, (3) associated geology integration information such as deposition faces and horizons, and (4) the upscaled well logs data (well data) may all be utilized as input to generate one or more starting models 400. The background and starting models may be derived from well data or seismic data. In operation 405, an elastic wavefield simulation engine with current models (such as one or more starting models in operation 405) generates a simulated seismic data, which may be a seismogram or synthetic data generated by an elastic wave equation using either volume integral or finite difference numerical methods. The elastic wavefield simulation engine includes an elastic wave equation and a numerical solver, which is based on a volume integral approach with improved tolerance to numerical dispersion.

In operation, 410, the simulated seismic data is checked to determine whether the data misfit is small enough by comparing observed data (seismic migration gathers or seismic mitigated data) with simulated data so that the one or more current models may be output as final models. A misfit is the difference between an input observed seismogram such as seismic migrated gathers. Epsilon, which may be a parameter supplied by the user, is used to evaluate this difference between observed data and synthetic data. Epsilon may be set in a range of 0.001 and 0.01. If the data misfit is determined to be small enough in operation 410, the current models are output as final models, including compressional velocity (Vp), shear velocity (Vs), and density, in operation 415. If the data misfit is determined to be too large (not small enough), the current models are supplied to the elastic wave equation inversion in operation 420. In operation 420, the elastic wave equation receives the current models as well as the prior models. With these models received in operation 420, an optimization objective that includes a data misfit function and regularization term associated with the prior models is constructed. Based on the data misfit function, subsurface models are estimated in an iterative way using a local optimization algorithm such as a steep descent method or conjugate gradient method.

The operations to provide a prior model include operations 422, 424, 426, and 428, which will be described below.

In operation 422, the prestack seismic migrated data, which may be referred to as seismic data, is shifted from an acquisition surface to a top of a reservoir target with a data-mining approach to assist the hybrid seismic inversion approach in implementing a target-oriented inversion. After the shifting of the seismic data in operation 422, seismic attributes are calculated in operation 424. As discussed above, examples of seismic attributes include amplitude envelope, amplitude weighted frequency, amplitude weighted phase, average frequency, apparent polarity, cosine instantaneous phase, derivative of seismic data, derivative instantaneous amplitude, dominant frequency, instantaneous frequency, instantaneous phase, and integrated absolute amplitude.

In operation 426, correlation coefficients of the seismic attributes between a spatial location of a well and non-well locations are computed. More specifically, a commonly used interpolation method is simple Kriging which is based on variograms for the spatial local interpolation. Seismic waveforms and seismic attributes of the seismic data are used to calculate the correlation or similarity coefficients between spatial locations including well data with the assumption that seismic waveforms carry out subsurface model information.

Based on the computed correlation coefficients, a prior model is generated in operation 428 in a way of seismic attribute-guided well extrapolation and supplied to the elastic wave equation inversion operation 420 as a prior model.

As discussed above with respect to operation 426, correlation coefficients of the seismic attributes between a spatial location of a well and non-well locations are computed. More specifically, a commonly used interpolation method is simple Kriging which is based on variograms for the spatial local interpolation. Seismic waveforms and seismic attributes of the seismic waveforms are used to calculate the correlation or similarity coefficients between spatial locations including well data with the assumption that seismic waveforms carry out subsurface model information. Based on the computed correlation coefficients, a prior model is generated in operation 428. The correlation coefficients of seismic waveform between location to be inverted and known well location instead of covariance are used to construct non-bias linear equations. The final weight coefficient A is estimated by solving linear equations and used to yield the prior model (operation 428) as follows in equation 4.

$$m(x_p) = \Sigma_{j=1}^{N} (x_j) m(x_j) \quad \text{(Equation 4).}$$

where the subscript p and j, respectively, denote the index of points to be inverted and well locations.

Together with computed mean $\mu$, variance $\sigma$ and correlation coefficients COR of known models, the local mean $\sigma_P$ and variance $\sigma_P$ of unknown location are computed to construct a local probability distribution in operation 430 using equations 5 and 6 below, which receives well data, a prior model from operation 428, and the results of the elastic wave equation inversion operation of operation 420.

$$\mu_p = \mu + \Sigma_{j=1}^{N} A(x_j)[m(x_j) - \mu] \quad \text{(Equation 5).}$$

$$\sigma_p^2 = \sigma + \Sigma_{j=1}^{N} A(x_j) COR(x_j, x_p) \quad \text{(Equation 6).}$$

Based on above local prior model distribution and wave equation inversion results distribution, operation 430 constructs a posterior probability distribution function (or posterior probability density function) with a Bayesian theorem using likelihood function and a joint prior probability distribution function using a Kriging method.

Once a joint probability distribution is created, the hybrid seismic inversion method performs the operation of operation 440, which utilizes a perturbate model with a stochastic sampling algorithm for sampling. More specifically, once a joint probability distribution is created, the operation 440 randomly samples the simulated value in model space and adds the simulated value to the set of the known sampled points until all unknown locations are simulated in the original model space to achieve the goal of one simulation implementation. In operation 440, new candidate models are created by randomly walking the model space using sampling based on posterior probability distribution.

In operation 440, new models are created, which are accepted or rejected based on criteria. With a forward modeling engine in operation 440, the simulated stochastic results from above steps are considered as new models to yield synthetic seismograms and compared with observed seismic data from the target top seismic survey region 101. If the result cannot meet the misfit tolerance for accuracy, the simulation of the model location is repeated until obtaining a good match between synthetic seismograms and observed seismic data. Otherwise continue to perturbate next submodel samples in the current model to be inverted until whole model is sampled. A whole model may be a two-dimensional (2D) model or three-dimensional (3D) model, which includes one-dimensional (1D) models.

If whole model samples are not completely searched and perturbated, operations must be performed again beginning with operations 430 and 440. Otherwise, among all the realizations, the value of the model having the best match with synthetic seismograms as the result of inversion is chosen. The best inversion model is chosen based on matching of the geological knowledge or using the mean or weighted average of multiple realizations as the final inversion result.

Referencing FIG. 4 in more detail, operations 430, 440, and 450 are for a single trace inversion with multiple realizations. After finishing a single trace, operation 460 selects the probable model from the multi-candidate models in operations 440 and 450 as the new model for this trace. Operation 470 determines if all of the trace models are completed. If all of the traces of the models are finished, a final model is supplied to operation 415, which outputs the final model. Otherwise, operations 430 through 460 are repeated until all of the traces of the models are completed so that operation 470 supplies a final model to operation 415, which outputs the final model.

While embodiments of this disclosure have been shown and described, modifications can be made by one skilled in the art without departing from the spirit or teaching of this invention. The embodiments described herein are exemplary only and are not limiting. Many variations and modifications of methods, systems and apparatuses are possible and are within the scope of the invention. Accordingly, the scope of protection is not limited to the embodiments described herein but is only limited by the claims. The scope of the claims shall include all equivalents of the subject matter of the claims.

What is claimed is:

1. A method for generating one or more final models for reservoir characterization of a survey region, the method comprising:
    positioning seismic data recording sensors in the survey region at different locations and positioning a well bore data recording sensor in a wellbore, which has a wellbore location;
    blasting at points of incidence in the survey region;
    retrieving seismic data using the seismic data recording sensors, transmitting the seismic data to a database, and storing the seismic data in the database;
    retrieving well data using the well bore sensor in the wellbore, transmitting the well data to the database, and storing the seismic data in the database;
    storing geology integration information and one or more background models in the database;
    retrieving, by a computer system, the seismic data and processing the seismic data to mitigate the seismic data for a seismic hybrid inversion; and
    performing, by the computer system, the seismic hybrid inversion including performing wave equation inversion and stochastic inversion to generate the one or more final models for the reservoir characterization of the survey region.

2. The method of claim 1, wherein the seismic data recording sensors and the well bore recording sensor are the same sensors.

3. The method of claim 1, wherein the performing, by the computer system, the seismic hybrid inversion further comprises:
    shifting processed seismic data on an acquisition surface to a top of a reservoir target;
    calculating seismic attributes based on the shifted seismic data;
    computing correlation coefficients of the seismic attributes between spatial locations of the well bore and the seismic data recording sensors;
    generating a prior model based on the correlation coefficients of the seismic attributes; and
    communicating at least one of the elastic wave equation inversion and the stochastic inversion to communicate the prior model.

4. The method of claim 3, wherein the shifted processed seismic data on the acquisition surface is shifted to a top of a reservoir target by performing a data-mining process.

5. The method of claim 3, wherein the seismic attributes include amplitude envelope, amplitude weighted frequency, amplitude weighted phase, average frequency, apparent polarity, cosine instantaneous phase, derivative of seismic data, derivative instantaneous amplitude, dominant frequency, instantaneous frequency, instantaneous phase, and integrated absolute amplitude.

6. The method of claim 3, wherein the performing, by the computer system, the seismic hybrid inversion further comprises outputting the final models.

7. The method of claim 1, wherein the performing, by the computer system, the seismic hybrid inversion further comprises generating a starting model based on the processed seismic data, well data, geology integration information, and one or more background models, wherein the one or more background models are current models.

8. The method of claim 1, wherein the geology integration information includes one or more horizons, and wherein the background models include one or more of a P-wave velocity model, an S-wave velocity model, and a density model.

9. The method of claim 1, wherein the performing, by the computer system, the seismic hybrid inversion further comprises generating simulated seismic data, which is a seismogram or synthetic data generated by an elastic wave equation.

10. The method of claim 1, wherein performing, by the computer system, the seismic hybrid inversion further comprises:
    determining an amount of a data misfit;
    outputting one or more final models for the reservoir characterization of the survey region based on the amount of the data misfit being less than an allowable value; and
    performing the elastic wave equation inversion on one or more current models based on the amount of the data misfit exceeding an allowable value.

11. The method of claim 10, wherein the allowable value is in the range of 0.001 to 0.01.

12. A method of claim 10, wherein the performing, by the computer system, the seismic hybrid inversion further comprises constructing a posterior a posterior density function with a Bayesian theorem using likelihood function and a joint probability density distribution function using a Kriging method based on well data, the elastic wave equation inversion, and a prior model.

13. The method of claim 12, wherein the prior model is generated based on correlation coefficients of seismic attributes calculated based on shifting seismic data on an acquisition surface to a top of a reservoir target, and wherein the correlation coefficients of seismic attributes are between spatial locations of the well bore and the seismic data recording sensors.

14. The method of claim 12, wherein the performing, by the computer system, the seismic hybrid inversion further comprises randomly sampling a simulated value in model space and adding the simulated value to the set of the known sampled points until all unknown locations are simulated in the model space.

15. An apparatus for generating one or more final models for reservoir characterization of a survey region, the apparatus comprising:
    a plurality of seismic data recording sensors positioned at different locations in the survey region to detect seismic data and transmit seismic data;
    a well bore data recording sensor positioned in a wellbore of the survey region to detect seismic data and transmit seismic data;
    at least one memory storing the transmitted seismic data, geology integration information, and one or more background models, the at least one memory comprising instructions and at least one processor to execute instructions stored in the at least one memory to implement:
        processing the seismic data to mitigate the seismic data for a seismic hybrid inversion; and
        performing the seismic hybrid inversion including performing wave equation inversion and stochastic inversion to generate the one or more final models for the reservoir characterization of the survey region.

16. The apparatus of claim 15, wherein the performing the seismic hybrid inversion further comprises:
performing the seismic hybrid inversion further comprises:
shifting processed seismic data on an acquisition surface to a top of a reservoir target;
calculating seismic attributes based on the shifted seismic data;
computing correlation coefficients of the seismic attributes between spatial locations of the well bore and the seismic data recording sensors;
generating a prior model based on the correlation coefficients of the seismic attributes; and
communicating at least one of the elastic wave equation inversion and the stochastic inversion to communicate the prior model.

17. The apparatus of claim 16, wherein the shifted processed seismic data on the acquisition surface is shifted to a top of a reservoir target by performing a data-mining process.

18. The apparatus of claim 16, wherein the seismic attributes include amplitude envelope, amplitude weighted frequency, amplitude weighted phase, average frequency, apparent polarity, cosine instantaneous phase, derivative of seismic data, derivative instantaneous amplitude, dominant frequency, instantaneous frequency, instantaneous phase, and integrated absolute amplitude.

19. The apparatus of claim 15, wherein performing, by the computer system, the seismic hybrid inversion further comprises generating a starting model based on the processed seismic data, well data, geology integration information, and one or more background models, wherein the one or more background models are current models.

20. The apparatus of claim 19, wherein the geology integration information includes one or more horizons, and wherein the background models include one or more of a P-wave velocity model, an S-wave velocity model, and a density model.

* * * * *